United States Patent
Kaupert et al.

(10) Patent No.: US 6,810,658 B2
(45) Date of Patent: Nov. 2, 2004

(54) EXHAUST-GAS PURIFICATION INSTALLATION AND EXHAUST-GAS PURIFICATION METHOD FOR PURIFYING AN EXHAUST GAS FROM AN INTERNAL COMBUSTION ENGINE

(75) Inventors: Andreas Kaupert, Ulm (DE); Joerg Strauhs, Laichingen (DE); Norbert Wiesheu, Guenzburg (DE)

(73) Assignee: DaimlerChrysler Ag, Stuttgart (DE)

( * ) Notice: Subject to any disclaimer, the term of this patent is extended or adjusted under 35 U.S.C. 154(b) by 0 days.

(21) Appl. No.: 10/382,994

(22) Filed: Mar. 7, 2003

(65) Prior Publication Data

US 2003/0217729 A1 Nov. 27, 2003

(30) Foreign Application Priority Data

Mar. 8, 2002  (DE) ......................................... 102 10 367

(51) Int. Cl.[7] ................................................ F01N 3/00
(52) U.S. Cl. ............................. 60/274; 60/278; 60/279; 123/1 A; 123/3; 123/568.15
(58) Field of Search .......................... 60/274, 278, 279, 60/275, 301, 285, 286, 295, 303; 123/1 A, 3, DIG. 12, 568.15

(56) References Cited

U.S. PATENT DOCUMENTS

| | | | | |
|---|---|---|---|---|
| 4,059,076 A | * | 11/1977 | Kosaka et al. .................. 123/3 |
| 4,716,859 A | * | 1/1988 | Konig et al. .................... 123/3 |
| 4,735,186 A | * | 4/1988 | Parsons .......................... 123/3 |
| 5,412,946 A | * | 5/1995 | Oshima et al. ................. 60/286 |
| 5,437,250 A | * | 8/1995 | Rabinovich et al. ........... 123/3 |
| 6,079,373 A | * | 6/2000 | Kawamura ..................... 123/3 |
| 6,092,512 A | * | 7/2000 | Ma ........................ 123/568.15 |
| 6,176,078 B1 | * | 1/2001 | Balko et al. ................... 60/274 |
| 6,557,342 B2 | * | 5/2003 | Suga et al. .................... 60/301 |
| 6,560,958 B1 | * | 5/2003 | Bromberg et al. ............. 60/275 |
| 2003/0221413 A1 | * | 12/2003 | Buglass et al.. ............... 60/275 |

FOREIGN PATENT DOCUMENTS

| | | | | |
|---|---|---|---|---|
| DE | 19828807 A1 | | 8/1999 | |
| EP | 0537968 A1 | | 4/1993 | |
| EP | 0621400 B1 | | 3/1999 | |
| JP | 54111011 A | * | 8/1979 | .......... F02M/27/02 |
| JP | 54118914 A | * | 9/1979 | .......... F02M/33/00 |

* cited by examiner

*Primary Examiner*—Tu M. Nguyen
(74) *Attorney, Agent, or Firm*—Crowell & Moring LLP

(57) ABSTRACT

An exhaust-gas purification installation for purifying exhaust gas from an internal combustion engine includes an exhaust-gas catalytic converter which is arranged in an exhaust pipe of the internal combustion engine and a catalytic fuel reformer for generating a hydrogen-containing reformer gas which can be fed to the exhaust pipe on an entry side of the exhaust-gas catalytic converter. It is possible for a hydrocarbon-containing fuel, which can be used to operate the internal combustion engine, to be fed to the fuel reformer in order to generate the reformer gas. An exhaust-gas heater can heat the exhaust-gas part-stream which is fed to the fuel reformer. In a method according to the invention, an exhaust-gas part-stream which is removed from the exhaust pipe is heated and fed to the fuel reformer.

41 Claims, 2 Drawing Sheets

EXHAUST-GAS PURIFICATION INSTALLATION AND EXHAUST-GAS PURIFICATION METHOD FOR PURIFYING AN EXHAUST GAS FROM AN INTERNAL COMBUSTION ENGINE

This application claims the priority of German application 102 103 67.4, filed Mar. 8, 2002, the disclosure of which is expressly incorporated by reference herein.

BACKGROUND AND SUMMARY OF THE INVENTION

The present invention relates to an exhaust-gas purification installation, for purifying an exhaust gas from an internal combustion engine, having an exhaust-gas catalytic converter which is arranged in an exhaust pipe of the internal combustion engine, and a catalytic fuel reformer adapted to generate a hydrogen-containing reformer gas which can be fed to the exhaust pipe on an entry side of the exhaust-gas catalytic converter. A hydrocarbon-containing fuel, which can be used to operate the internal combustion engine, may be fed to the fuel reformer in order to generate the reformer gas. The invention also relates to an exhaust-gas purification method for purifying exhaust gas from an internal combustion engine, using an exhaust-gas purification system having an exhaust pipe with an exhaust-gas catalytic converter arranged in the pipe and a catalytic fuel reformer, in which a fuel which is used to operate the internal combustion engine is fed to the fuel reformer in order to generate a hydrogen-containing reformer gas.

It is known from laid-open European specification EP 0 537 968 A1 to feed hydrogen-containing gas to exhaust gas from a lean-burn internal combustion engine in order to reduce nitrogen oxides. It is possible to achieve a relatively high reduction in the levels of nitrogen oxides using the supplied hydrogen at relatively low temperatures at special denox catalytic converters even when an excess of oxygen (lean exhaust-gas condition) is present. To generate the hydrogen-containing gas, in European specification EP 0 537 968 A1, it is proposed to use a catalytic reformer in which a fuel which is available on board the corresponding motor vehicle is reacted with the exhaust gas from the internal combustion engine, if appropriate with the addition of water, to form a hydrogen-containing reformer gas which is fed to the denox catalytic converter. Heating the reformer to its operating temperature and maintaining this operating temperature are achieved by the quantitative control of the flow of hot exhaust gas to the reformer. However, hot exhaust gas is not available immediately after the internal combustion engine has been started up, and consequently it takes a certain time to heat up the installation which has been described to its operating temperature, and the function of reducing the levels of nitrogen oxides is likewise only available after a certain time.

Furthermore, it is known from European Patent EP 0 621 400 B1 to feed reducing agent to the exhaust gas from an air-compressing internal combustion engine, i.e. an internal combustion engine which is usually operated with excess air, by late injection of fuel. Depending on the injection time, this fuel is used to heat the exhaust-gas after-treatment device by means of catalytic oxidation at an exhaust-gas catalytic converter or as a reaction partner for reducing the levels of nitrogen oxides at a denox catalytic converter. On account of the method by which it is provided, the reducing agent which is made available consists predominantly of hydrocarbons. However, these hydrocarbons are relatively slow to react compared to hydrogen and, consequently, neither the heating of the exhaust-gas after-treatment device nor the catalytic reduction in the levels of nitrogen oxides at low exhaust-gas temperatures is possible.

It is an object of the invention, using a fuel reformer, to provide an exhaust-gas purification installation and an exhaust-gas purification method with an improved exhaust-gas purification function in which improved operation of the fuel reformer is also possible. This object is achieved by way of an exhaust-gas purification installation having an exhaust-gas heater provided so as to heat an exhaust-gas part-stream which is fed to the fuel reformer. This object is also achieved by way of an exhaust-gas purification method including removing an exhaust-gas part-stream from the exhaust pipe, heating the exhaust-gas part-stream, and feeding the heated exhaust-gas part-stream to the fuel reformer.

An exhaust-gas purification installation according to the invention is distinguished by the fact that it has an exhaust-gas heater for heating an exhaust-gas part-stream fed to the fuel reformer. The reformer and the exhaust-gas heater are arranged as separate components in an additional branch outside the internal combustion engine exhaust pipe but on board a motor vehicle associated with the internal combustion engine. The reformer and the exhaust-gas heater can therefore be operated as far as possible independently of the operating state of the internal combustion engine. To generate a hydrogen-containing reformer gas, an exhaust-gas part-stream which is removed from the exhaust pipe of the internal combustion engine at any desired point flows through the reformer. The exhaust-gas part-stream is, at least from time to time and preferably when the reformer is starting up until it reaches its normal operating state, heated by the exhaust-gas heater before being fed to the reformer. As a result, the reformer catalytic converter is heated at the same time. The fuel which is also required to operate the reformer is taken from the normal fuel supply to the internal combustion engine and injected into the heated exhaust gas on the entry side of the reformer where it is, at least for the most part, vaporized. The heating of an exhaust-gas part-stream naturally takes place more quickly and effectively than the heating of the entire exhaust-gas stream, and consequently the reformer is soon ready for operation and able to supply hydrogen-containing reformer gas. At the same time, the outlay on energy is kept at a low level. Compared to the injection of the fuel into the main-gas stream, moreover, the arrangement according to the invention achieves significantly improved homogenization of the mixture fed to the reformer and therefore effective fuel reforming with a high yield of hydrogen.

In one configuration of the invention, the exhaust-gas heater is of electrically heatable design. The electrical energy required for the heating operation may, for example, be taken from the on-board power supply of the motor vehicle in question. The use of electric heating for the exhaust-gas heater allows the exhaust-gas part-stream to be heated very quickly and, moreover, a high degree of flexibility with regard to the shape of the exhaust-gas heater, since electrical heater elements for different outputs and operating voltages are commercially available at low cost in a very wide variety of forms.

In a further configuration of the invention, the exhaust-gas heater is of cylindrical configuration and, in its interior, has a coiled passage, which runs substantially in the axial direction, for guiding the exhaust-gas part-stream. This embodiment of the exhaust-gas heater creates a large heat-transfer surface area and achieves a correspondingly good heat transfer from the electrical heating to the exhaust-gas part-stream. For this purpose, the electrical heating may be provided in such a way that the inner or outer wall, as seen in the radial direction, or both walls of the coiled passage can be heated by one electrical heater element.

In a further configuration of the invention, a high-temperature heat exchanger, by means of which heat is transferred from the reformer gas emerging from the reformer to the exhaust-gas part-stream fed to the reformer, is also provided as part of the exhaust-gas purification installation. In this case, the high-temperature heat exchanger is connected downstream of the reformer in terms of flow and the reformer gas flows through it. Since the reforming process in the reformer preferably takes place at temperatures of above 500° C., the reformer gas which leaves the reformer has a relatively high heat content, a large proportion of which can therefore be fed to the charge gas. In this way, the energy balance of the reforming process can be improved and, during normal operation, additional electrical heating of the exhaust-gas part-stream by the exhaust-gas heater can be avoided or kept to a minimum.

In a further configuration of the invention, the exhaust-gas part-stream can be fed to the fuel reformer via the exhaust-gas heater and/or via the high-temperature heat exchanger, as desired. To optionally switch over the path along which the exhaust-gas part-stream which is fed to the reformer is guided, suitable switching means, such as three-way valves or the like, can be provided. The possibility of switching the path over which the gas is guided makes it possible to keep the distance over which the exhaust-gas part-stream is carried and therefore heat losses at a low level. Therefore, the switching preferably takes place as a function of the reformer operation. When the reformer is being run up to its normal operating state, it is preferable for the exhaust-gas part-stream to be guided via the heat of the exhaust-gas heater, and when the reformer is operating normally it is preferable for the exhaust-gas part-stream to be guided only via the high-temperature heat exchanger. There is preferably also provision for the flow to be guided in such a way that the exhaust-gas part-stream flows through the high-temperature heat exchanger and the exhaust-gas heater in succession.

In a further configuration of the invention, an oxidation catalytic converter is arranged in the exhaust pipe of the internal combustion engine. It is preferable for this oxidation catalytic converter to be arranged in the exhaust pipe close to the internal combustion engine. The reformer gas is fed into the exhaust pipe on the entry side of this catalytic converter as required. On account of the high reactivity of the reformer gas, the catalytically assisted oxidation process in this catalytic converter starts at relatively low temperatures. The heat of reaction which is liberated during this reaction heats the catalytic converter and therefore rapidly increases its catalytic activity even with respect to harmful exhaust-gas constituents which are more difficult to oxidize. As a result, for example when the internal combustion engine is warming up, effective exhaust-gas purification can take place at an earlier time, and therefore the overall emissions of pollutants from the internal combustion engine can be reduced.

In a further configuration of the invention, what is known as a denox catalytic converter is arranged in the exhaust pipe of the internal combustion engine. It is known that catalytic converters of this type are able to catalyse a chemical reduction of nitrogen oxides to form harmless nitrogen under oxidizing conditions using reducing agents which are present in the exhaust gas, such as hydrocarbons or hydrogen. Particularly at low temperatures, in this respect hydrogen represents a very effective and selective reducing agent. Therefore, providing the hydrogen-containing reforming gas makes it possible to achieve an effective reduction in the levels of nitrogen oxides even at low exhaust-gas temperatures, in particular in the case of lean-burn internal combustion engines. This means firstly that the reduction in the levels of nitrogen oxides becomes possible at an early time while the internal combustion engine is still warming up. Secondly, it is possible to elect for the denox catalytic converter to be installed away from the internal combustion engine, where the temperature level is correspondingly low, with the result that greater flexibility in terms of the design of the exhaust-gas purification installation is achieved.

In a further configuration of the invention, an oxidation catalytic converter, which is preferably arranged close to the internal combustion engine, and in addition, further downstream, what is known as a denox catalytic converter are arranged in the exhaust pipe of the internal combustion engine. The reformer gas can be fed to the exhaust pipe on the entry side of both catalytic converters. Therefore, the exhaust-gas purification device which is designed in this way can simultaneously achieve both a reduction in the levels of pollutants emitted while the engine is warming up and a reduction in the levels of nitrogen oxides even when the denox catalytic converter is in an unfavourable installation position or when the exhaust-gas temperatures are low. This is advantageous in particular in the case of an internal combustion engine which is operated predominantly under lean-burn conditions, such as a direct-injection spark-ignition engine operated in stratified-charge mode, a diesel engine or a gas turbine, since these internal combustion engines operate with a very high level of efficiency and therefore have a low exhaust-gas temperature. The exhaust-gas purification installation has switching means for distributing the reformer gas as required, in such a manner that the reformer gas can be fed to the oxidation catalytic converter or the denox catalytic converter or both catalytic converters in a controlled quantity as a function of the internal combustion engine operation and/or as a function of the temperature of the catalytic converters.

A method according to the invention is distinguished by the fact that an exhaust-gas part-stream which is removed from the exhaust pipe is heated and fed to the fuel reformer. An advantage in this context is a high heating temperature, with the result that when the reformer is being started up the heated exhaust-gas part-stream for its part rapidly heats the reformer catalytic converter. With this method, the reformer catalytic converter is heated significantly more quickly than if, for example, the reformer itself or the housing of the reformer were to be externally heated or if the entire exhaust-gas stream had to be heated. In this way, the reformer or its catalytic converter rapidly reaches its operating temperature, whereupon fuel can be injected into the heated exhaust-gas part-stream on the entry side of the reformer. When the exhaust-gas part-stream is at a sufficiently high temperature, the injected fuel is completely or almost completely vaporized, with the result that good homogenization of the exhaust-gas/fuel mixture is achieved. In this case too, it has proven advantageous to use an exhaust-gas part-stream and to preheat it, since, by way of example, injection of cold fuel into the main exhaust-gas stream would lead to incomplete vaporization of the fuel, with correspondingly poor homogenization of the mixture. The overall result of the method according to the invention is that the reformer is rapidly ready to operate and can supply hydrogen-containing reformer gas correspondingly quickly. After the reformer has started up, furthermore, preheated exhaust gas is fed to the reformer, which improves the heat balance of the latter and obviates the need for external heating.

In one configuration of the method, in order to heat the exhaust-gas part-stream the latter is passed through a separate exhaust-gas heater. The use of a separate, in particular electrically heated, exhaust-gas heater of this type allows the exhaust-gas part-stream to be heated up with little inertia and as required.

In one configuration of the method, in order to heat the exhaust-gas part-stream it is passed through an exhaust-gas heater and/or through a high-temperature heat exchanger through which the reformer gas flows. The gas is preferably guided by switching the gas path as required. When the reformer is being run up to its normal operating state, it is preferable for the exhaust-gas part-stream to be guided via the heated exhaust-gas heater. Once the reformer has been started up and is in its normal operating state, it supplies hot reformer gas at approximately 500° C. or more. This heat content can be at least partially transferred to the exhaust-gas part-stream used by means of a high-temperature heat exchanger, with the result that the heat balance of the reforming process is improved. Depending on the size of the reformer-gas stream required and on the operating state of the reformer, it may be advantageous for the exhaust-gas part-stream to be additionally or exclusively passed through the exhaust-gas heater.

In a further configuration of the method, the exhaust-gas heater is electrically heated at least from time to time. The use of electrical energy for heating, for example by means of heating conductors or heater cartridges, results in advantages with regard to controllability and usability. The heating of the exhaust-gas heater preferably takes place when the reformer is starting up or at operating times when the reformer requires increased levels of heat, such as for example when there is an increased demand for reformer gas.

In a further configuration of the method, the exhaust-gas part-stream is passed through the heated exhaust-gas heater when the reformer is being started up. After the normal operating state of the reformer has been reached, the preheating of the exhaust-gas part-stream is effected predominantly by the high-temperature heat exchanger. For this purpose, the gas flow is switched over accordingly if necessary. This procedure makes it possible to make economical use of energy, since the heating of the exhaust-gas heater is predominantly switched off after the reformer has been started up.

In a further configuration of the method, the reformer-gas stream is fed to the exhaust gas upstream of the exhaust-gas catalytic converter at least from time to time when the exhaust gas from the internal combustion engine which is fed to the exhaust-gas catalytic converter has an excess of air. This preferably takes place after a cold start of the internal combustion engine and/or when the internal combustion engine is warming up, during which period it is operated with a lean air/fuel ratio. However, the internal combustion engine may also be operated with a rich air/fuel ratio during a cold start or while it is warming up, in which case secondary air is added to the exhaust gas upstream of the exhaust-gas catalytic converter, and as a result an exhaust gas with excess oxygen is established. In both cases, the result is that the exhaust-gas catalytic converter quickly reaches its operating temperature, since the oxidation of the reformer gas supplied, on account of its reactivity, takes place even when the exhaust-gas catalytic converter has only been heated to a relatively low temperature, and the heat of reaction which is liberated in the process rapidly heats the exhaust-gas catalytic converter. Of course, the supply of the reformer gas for heating the exhaust-gas catalytic converter may also take place during normal operation of the internal combustion engine, preferably if the exhaust-gas catalytic converter cools down excessively. This ensures that the catalytic converter function is maintained. The procedure described can be used with both a denox catalytic converter and an oxidation catalytic converter arranged in the exhaust pipe.

In a further configuration of the method, the reformer gas which is generated by the reformer is fed to the exhaust gas upstream of the exhaust-gas catalytic converter at least from time to time when a temperature on the entry side of the exhaust-gas catalytic converter or in the exhaust-gas catalytic converter falls below a predeterminable limit value. For this purpose, the temperature is expediently monitored or determined in some other way. In this way, the reformer gas can be added to the exhaust-gas catalytic converter according to demand.

Further features and combinations of features will emerge from the description and the drawings. For this purpose, the text which follows explains the invention in more detail with reference to drawings and associated examples.

DETAILED DESCRIPTION OF THE INVENTION

Figure 1:
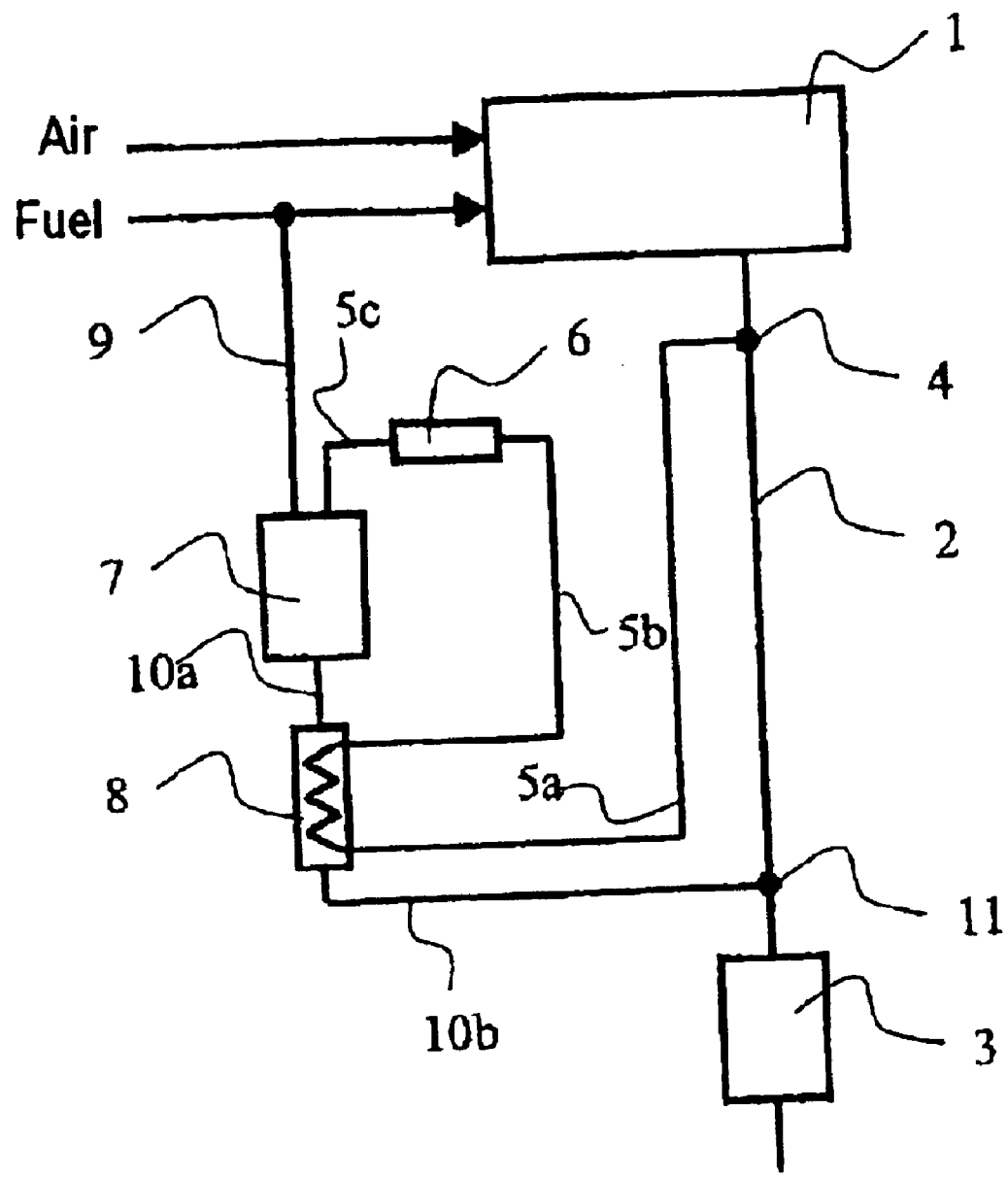
FIG. 1 is a diagrammatic outline illustration of an arrangement of internal combustion engine and associated exhaust-gas purification installation.

FIG. 1 diagrammatically depicts an internal combustion engine 1 having the exhaust-gas purification installation according to the invention, which here substantially comprises an exhaust pipe 2 with catalytic converter system 3, an exhaust-gas heater 6, a fuel reformer 7 and a high-temperature heat exchanger 8. The internal combustion engine is supplied with air and fuel via feed systems (not shown in more detail) and releases the exhaust gas produced to the environment via the exhaust pipe 2. In the exhaust pipe 2 there is a catalytic converter system 3 which is used for catalytically assisted purification of the exhaust gas. The catalytic converter system 3 can be configured differently from case to case and may, for example, have a denox catalytic converter and/or an oxidation catalytic converter arranged close to the internal combustion engine. To purify the exhaust gas, the fuel reformer 7 at least from time to time generates a hydrogen-containing reformer gas which is fed to the exhaust pipe via a high-temperature heat exchanger 8 and a system of lines 10a, 10b, at a feed point 11 on the entry side of one or more catalytic converters of the catalytic converter system 3. To generate the hydrogen-containing gas, the reformer 7 includes a reformer catalytic converter which is suitable for this purpose and with the aid of which fuel is treated so as to form a reformer gas in a reforming reaction which takes place with a deficit of air at elevated temperatures of preferably over 500° C. For this purpose, the reformer 7 is firstly supplied with fuel, which is removed from the fuel supply system of the internal combustion engine 1 at a suitable location. Secondly, the reformer is supplied with a part-stream of the internal combustion engine exhaust gas via a system of lines 5a, 5b, 5c. The exhaust-gas part-stream is removed from the exhaust pipe 2 at a removal point 4 and passed via the high-temperature heat exchanger 8 and/or the exhaust-gas heater 6 before entering the reformer 7.

It will be understood that the internal combustion engine 1 and the exhaust-gas purification installation also have further components, which are not shown here and are used to record and, if appropriate, control their operating parameters. These include in particular devices for recording and/or controlling the temperatures of the catalytic converters of the catalytic converter system 3 and of the reformer 7 and also of the exhaust-gas heater 6 and the heat exchanger 8. Also included are further devices for controlling the quantity of fuel fed to the reformer and the exhaust-gas part-stream, and devices for delivering these reformer operating substances and the reformer gas generated. The internal combustion engine has an electronic control unit which, inter alia, controls the quantity and the quantitative ratio of air and fuel. It is preferable for this control unit also to be used to administer the control tasks referred to above.

The following text explains operation of the installation as preferably takes place when an oxidation catalytic converter which is present in the catalytic converter system 3 is at a temperature which is below a predeterminable limit temperature. This occurs mainly during a cold start or warming-up of the internal combustion engine 1 or during operation under a low load. The limit temperature is expediently selected in such a way that it approximately corresponds to what is known as the light-off temperature of the oxidation catalytic converter, i.e. the temperature above which the latter is able to oxidize most of the oxidizable constituents which are present in the exhaust gas from the internal combustion engine 1. The installation is operated in such a way that the internal combustion engine 1 is supplied with an air-fuel mixture which leads to a lean exhaust-gas composition, i.e. an excess of oxygen. The exhaust-gas heater 6 is heated by means of an electrical heater device using on-board power, and an exhaust-gas part-stream is removed from the exhaust pipe 2 at the removal point 4 and fed to the exhaust-gas heater 6. For this purpose, the part-stream can be guided either via the line 5a, the heat exchanger 8 and the line 5b or, to avoid heat losses, directly from the removal point 4 to the exhaust-gas heater 6 via a switching point (not shown), so as to bypass the heat exchanger 8. Exhaust gas which has been heated in the exhaust-gas heater is fed onwards via the line 5c to the reformer, with the result that the catalytic converter of the latter is likewise heated. When the operating temperature of the reformer catalytic converter is reached, controlled amounts of fuel are additionally fed to the reformer 7 via the line 9, and this fuel is preferably added to the hot exhaust gas having been finely dispersed by means of an injection nozzle. The result is that a well prepared, for the most part single-phase fuel-air mixture is obtained, and this mixture is passed via the reformer catalytic converter. The quantitative air flow and the quantitative exhaust-gas part-stream are set in such a way that a fuel-air mixture with an excess of fuel or deficit of oxygen results. However, the setting is preferably such that the soot limit for the reforming process is not reached. In this case, the known processes of partial hydrocarbon oxidation take place in the reformer or at the reformer catalytic converter. In addition, steam reforming may in some cases take place on account of the steam content of the exhaust gas supplied. The result of these processes is a reformer gas which as its combustible constituents contains, in addition to carbon monoxide and low hydrocarbons, primarily hydrogen. This reformer gas is added to the catalytic converter system 3 on the entry side of the oxidation catalytic converter which it includes, at the addition point 11. On account of the high reactivity of the reformer gas, it can be oxidized by the oxygen contained in the exhaust gas even at low exhaust-gas temperatures at the oxidation catalytic converter. The heat of reaction which is liberated in the process heats the oxidation catalytic converter to above its light-off temperature, which is crucial for other exhaust-gas components, so that the converter reaches its state in which it is capable of normal operation.

The reforming process which takes place in the reformer 7 is preferably controlled in such a way that an exothermic sequence results. After normal operation of the reformer has commenced, therefore, the heating of the exhaust-gas heater 6 can be ended. It is preferably determined that the reformer 7 is ready for operation by means of a temperature measurement on the entry side of the reformer or in the reformer. If the temperature measurement shows that substantially complete vaporization of the fuel which is to be injected can take place, the injection of fuel on the entry side of the reformer 7 is commenced, and in this way the exothermic reforming process in the reformer 7 is started. The heating of the exhaust-gas part-stream fed to the reformer 7 is then carried out by the high-temperature heat exchanger 8, for which purpose the path over which the gas is guided is switched over if necessary. In the heat exchanger 8, the exhaust-gas part-stream takes up some of the heat of the hot reformer gas, so that even after the heating of the exhaust-gas heater 6 has been switched off, heated exhaust gas is still fed to the reformer 7. To avoid heat losses, in this case the exhaust-gas part-stream can be fed directly to the reformer 7 from the heat exchanger 8, bypassing the exhaust-gas heater 6, with the aid of a switchover, which is not shown. If this switchover is not present, the exhaust-gas part-stream successively flows through the heat exchanger 8 and the exhaust-gas heater 6. Guiding the gas in this way has the advantage that if necessary additional heating by means of the exhaust-gas heater 6 can be effected from time to time or with a limited power.

If the exothermic reactions in the oxidation catalytic converter of the catalytic converter system 3 has heated the latter to such an extent that it is in its normal operating state, the reformer throughput can be reduced or the supply of exhaust gas and fuel to the reformer 7 can be ended, and therefore the operation of the reformer can likewise be ended.

A further example of an application for use of the reformer 7 in the exhaust-gas purification system according to the invention results if the exhaust-gas purification system has a catalytic converter system 3 with what is known as a denox catalytic converter. A denox catalytic converter of this type is able to catalyse the reduction of nitrogen oxides in the exhaust gas even if excess oxygen is present. In this case, the reducing agent reduces the nitrogen oxides primarily to form harmless nitrogen. However, a precondition for this is that sufficient quantities of a suitable reducing agent be present in the exhaust gas. With the known denox catalytic converters, it is possible, when hydrocarbons are used as the reducing agent, to achieve nitrogen oxide conversion rates of approximately 50% in a temperature range from approximately 250° C. to approximately 350° C. In this context, the type of hydrocarbons is of crucial importance. Relatively good nitrogen oxide conversion rates are achieved with short-chain and/or unsaturated hydrocarbons. For this reason, the addition of fuel, such as petrol or diesel, to the exhaust gas in order to provide reducing agent is relatively ineffective. Hydrogen is known to be a very effective reducing agent, in particular at temperatures below 200° C., but it is difficult to provide hydrogen on board a motor vehicle. However, it is possible both to provide low hydrocarbons and to provide hydrogen as reducing agents with the aid of the reformer 7 as part of the exhaust-gas purification installation according to the invention. As a result, when a denox catalytic converter is being used, it is possible for nitrogen oxides to be reduced under lean exhaust-gas conditions over a wide temperature range. The exhaust-gas purification method is in this case carried out substantially as described above. A heated part-stream of the exhaust-gas from the internal combustion engine is fed to the reformer 7 using the exhaust-gas heater 6 and/or the heat exchanger 8. After the reformer catalytic converter has been heated up, the supply of fuel to the reformer 7 is commenced, and the reformer 7 supplies hydrogen-containing and hydrocarbon-containing reformer gas. This is fed via the heat exchanger 8 and via the line 10b to the exhaust pipe 2 on the entry side of the denox catalytic converter. Depending on the temperature of the denox catalytic converter or the oxygen/fuel ratio set in the reformer, the reformer process can be controlled in such a way that a more or less hydrogen-rich or a more or less hydrocarbon-rich reformer gas is obtained. As a result, optimum reduction in the levels of nitrogen oxides can be achieved over a wide temperature range of the denox catalytic converter. At low temperatures of the denox catalytic converter, a hydrogen-rich reformer gas tends to be generated, while at higher temperatures of the denox catalytic converter, a hydrocarbon-rich reformer gas tends to be generated.

It will be clear that the exhaust-gas purification installation may have both an oxidation catalytic converter and a denox catalytic converter as part of the catalytic converter system 3. In this case, the reformer gas of the reformer 7 can be fed into the exhaust pipe 2 both on the entry side of the oxidation catalytic converter, in order to activate the latter, and on the entry side of the denox catalytic converter. For this purpose, the feed line 10b has a branch leading to two addition points 11. Furthermore, in this case there are two devices for the controlled distribution of the corresponding reformer-gas streams. The branch and the duplication of the feed point 11 are not shown in FIG. 1.

Figure 2:
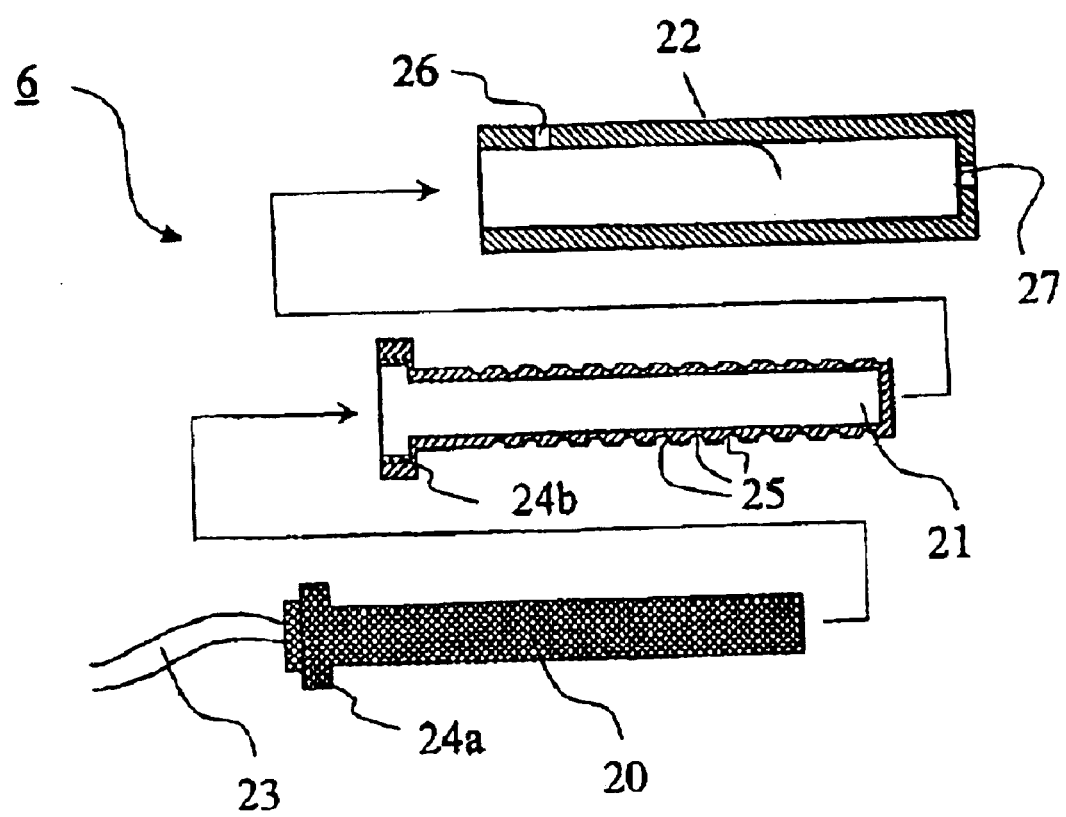
FIG. 2 is a drawing of an exemplary embodiment of the exhaust-gas heater assigned to the exhaust-gas purification installation.

FIG. 2 shows a preferred embodiment of the exhaust-gas heater 6, illustrated in an exploded view. The exhaust-gas heater substantially comprises a heater cartridge 20, a hollow-cylindrical insert 21 which is open on one side and a hollow-cylindrical outer tube 22 which is open on one side. The heater cartridge 20 and the insert 21 are each designed in the form of cylinders and have an external diameter and internal diameter over most of their lengths which are such that the heater cartridge 20 can be pushed in a tightly fitting manner into the insert 21. The result is a good heat transfer from the heater cartridge 20 to the insert 21. Heater cartridge 20 and insert 21 can be screwed together by means of the screw threads 24a and 24b. An electrical heater, which is designed as a resistance heater and the connections 23 of which are led out to the outside, is arranged inside the heater cartridge 20.

The insert 21 has a groove which runs helically and concentrically with respect to its longitudinal axis on its lateral surface over most of its length, similar to a screw thread. This is illustrated in the form of the thread turns 25 in the sectional illustration shown. The groove runs all the way to the closed end of the insert 21. The insert 21 is produced in such a way that it can be fitted tightly into the outer tube 22. The coiled groove or the thread turns 25, together with the outer tube 22 which is pushed on, form a coiled passage for guiding the exhaust gas which is to be heated.

In the region of the open end, the outer tube 22 has a radial bore 26 which is used to supply the exhaust-gas part-stream which is to be heated. By way of example, a connection tube can be introduced in a positively locking manner into this bore. The insert 21 and the outer tube 22 are produced in such a manner that, when the insert 21 has been pushed into the outer tube 22, exhaust gas can be fed through the bore 26 to the coiled passage formed between the two parts 21, 22. At the closed end, the outer tube 22 has an axial central bore 27 for discharging the exhaust gas which has been passed through the coiled passage. A connection tube may likewise be fitted in a positively locking manner into the central bore 27. Therefore, in the assembled state, the result is a compact exhaust-gas heater 6, by means of which the exhaust gas fed to the reformer 7 can be heated effectively to a relatively high temperature with a high level of efficiency. It will be understood that the electrical heating of the exhaust-gas heater 6 may additionally or exclusively also be effected by means of heater elements which on the outer side are wound around the exhaust-gas heater 6, for example in the form of the heater wire, or in some other way. Furthermore, it will be clear that the exhaust-gas heater 6 itself can be modified. By way of example, it is possible for the heater cartridge 20 itself to be provided with a coiled groove, in such a manner that after it has been pushed into the outer tube 22 a coiled gas passage results. In this way, it is possible to dispense with the insert 21.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An exhaust-gas purification method for purifying an exhaust gas from an internal combustion engine using an exhaust-gas purification system having an exhaust pipe with an exhaust-gas catalytic converter arranged in it and a catalytic fuel reformer, comprising:

feeding a fuel which is used to operate the internal combustion engine to the fuel reformer in order to generate a hydrogen-containing reformer gas, removing an exhaust-gas part-stream from the exhaust pipe, transferring heat between the reformer gas and the exhaust-gas part-stream by way of a heat exchanger, and feeding the exhaust-gas part-stream to the fuel reformer.

2. The exhaust-gas purification method according to claim 1, wherein the reformer gas generated by the reformer is fed to the exhaust gas upstream of the exhaust-gas catalytic converter at least from time to time when a temperature on the entry side of the exhaust-gas catalytic converter or in the exhaust-gas catalytic converter falls below a predeterminable limit value.

3. The exhaust-gas purification method according to claim 1, wherein the reformer gas which is generated by the reformer is fed to the exhaust gas upstream of the exhaust-gas catalytic converter at least from time to time when the exhaust gas from the internal combustion engine which is fed to the exhaust-gas catalytic converter has an excess of air.

4. The exhaust-gas purification method according to claim 3, wherein the reformer gas generated by the reformer is fed to the exhaust gas upstream of the exhaust-gas catalytic converter at least from time to time when a temperature on the entry side of the exhaust-gas catalytic converter or in the exhaust-gas catalytic converter falls below a predeterminable limit value.

5. The exhaust-gas purification method according to claim 1, wherein, in order to heat the exhaust-gas part-stream, the exhaust-gas part-stream is passed through a separate exhaust-gas heater.

6. The exhaust-gas purification method according to claim 5, wherein the reformer gas which is generated by the reformer is fed to the exhaust gas upstream of the exhaust-gas catalytic converter at least from time to time when the exhaust gas from the internal combustion engine which is fed to the exhaust-gas catalytic converter has an excess of air.

7. The exhaust-gas purification method according to claim 5, wherein the reformer gas generated by the reformer is fed to the exhaust gas upstream of the exhaust-gas catalytic converter at least from time to time when a temperature on the entry side of the exhaust-gas catalytic converter or in the exhaust-gas catalytic converter falls below a predeterminable limit value.

8. An exhaust-gas purification method for purifying an exhaust gas from an internal combustion engine using an exhaust-gas purification system having an exhaust pipe with an exhaust-gas catalytic converter arranged in it and a catalytic fuel reformer, comprising:

feeding a fuel which is used to operate the internal combustion engine to the fuel reformer in order to generate a hydrogen-containing reformer gas, removing an exhaust-gas part-stream from the exhaust pipe, heating the exhaust-gas part-stream, and feeding the heated exhaust-gas part-stream to the fuel reformer, wherein, in order to heat the exhaust-gas part-stream, the exhaust-gas part-stream is passed through at least one of an exhaust-gas heater and a high-temperature heat exchanger through which the reformer gas flows.

9. The exhaust-gas purification method according to claim 8, wherein the reformer gas which is generated by the reformer is fed to the exhaust gas upstream of the exhaust-gas catalytic converter at least from time to time when the exhaust gas from the internal combustion engine which is fed to the exhaust-gas catalytic converter has an excess of air.

10. The exhaust-gas purification method according to claim 8, wherein the reformer gas generated by the reformer is fed to the exhaust gas upstream of the exhaust-gas catalytic converter at least from time to time when a temperature on the entry side of the exhaust-gas catalytic converter or in the exhaust-gas catalytic converter falls below a predeterminable limit value.

11. The exhaust-gas purification method according to claim 8, wherein the exhaust-gas heater is electrically heated at least from time to time.

12. The exhaust-gas purification method according to claim 11, wherein the reformer gas which is generated by the reformer is fed to the exhaust gas upstream of the exhaust-gas catalytic converter at least from time to time when the exhaust gas from the internal combustion engine which is fed to the exhaust-gas catalytic converter has an excess of air.

13. The exhaust-gas purification method according to claim 11, wherein the reformer gas generated by the reformer is fed to the exhaust gas upstream of the exhaust-gas catalytic converter at least from time to time when a temperature on the entry side of the exhaust-gas catalytic converter or in the exhaust-gas catalytic converter falls below a predeterminable limit value.

14. The exhaust-gas purification method according to claim 11, wherein, when the fuel reformer is being started up, the exhaust-gas part-stream is passed through the electrically heated exhaust-gas heater and is heated in the process, and when the fuel reformer is operating normally, the exhaust-gas part-stream is passed through the high-temperature heat exchanger and is heated in the process.

15. The exhaust-gas purification method according to claim 14, wherein the reformer gas which is generated by the reformer is fed to the exhaust gas upstream of the exhaust-gas catalytic converter at least from time to time when the exhaust gas from the internal combustion engine which is fed to the exhaust-gas catalytic converter has an excess of air.

16. The exhaust-gas purification method according to claim 14, wherein the reformer gas generated by the reformer is fed to the exhaust gas upstream of the exhaust-gas catalytic converter at least from time to time when a temperature on the entry side of the exhaust-gas catalytic converter or in the exhaust-gas catalytic converter falls below a predeterminable limit value.

17. An exhaust-gas purification installation for purifying an exhaust gas from an internal combustion engine, comprising:

an exhaust-gas catalytic converter which is arranged in an exhaust pipe of the internal combustion engine, a catalytic fuel reformer adapted to generate a hydrogen-containing reformer gas which can be fed to the exhaust pipe on an entry side of the exhaust-gas catalytic converter, feeding of a hydrocarbon-containing fuel, which can be used to operate the internal combustion engine, to the fuel reformer being possible in order to generate the reformer gas, an exhaust-gas heater provided so as to heat an exhaust-gas part-stream which is fed to the fuel reformer, and a heat exchanger adapted to transfer heat between the reformer gas which emerges from the fuel reformer and the exhaust-gas part-stream which is fed to the fuel reformer.

18. The exhaust-gas purification installation according to claim 17, wherein the exhaust-gas catalytic converter is a denox catalytic converter.

19. The exhaust-gas purification installation according to claim 17, wherein the exhaust-gas catalytic converter is an oxidation catalytic converter.

20. The exhaust-gas purification installation according to claim 19, and further comprising a denox catalytic converter arranged in the exhaust pipe downstream of the oxidation catalytic converter, wherein the reformer gas can be fed to the entry side of the oxidation catalytic converter and to an entry side of the denox catalytic converter.

21. The exhaust-gas purification installation according to claim 17, wherein the exhaust-gas heater is electrically heatable.

22. The exhaust-gas purification installation according to claim 21, wherein the exhaust-gas heater is of cylindrical configuration and, in its interior, has a coiled passage, which runs substantially in the axial direction, for guiding the exhaust-gas part-stream.

23. The exhaust-gas purification installation according to claim 21, wherein the exhaust-gas catalytic converter is a denox catalytic converter.

24. The exhaust-gas purification installation according to claim 21, wherein the exhaust-gas catalytic converter is an oxidation catalytic converter.

25. The exhaust-gas purification installation according to claim 24, and further comprising a denox catalytic converter arranged in the exhaust pipe downstream of the oxidation catalytic converter, wherein the reformer gas can be fed to the entry side of the oxidation catalytic converter and to an entry side of the denox catalytic converter.

26. The exhaust-gas purification installation according to claim 17, wherein the exhaust-gas heater is of cylindrical configuration and, in its interior, has a coiled passage, which runs substantially in the axial direction, for guiding the exhaust-gas part-stream.

27. The exhaust-gas purification installation according to claim 26, wherein the exhaust-gas catalytic converter is a denox catalytic converter.

28. The exhaust-gas purification installation according to claim 26, wherein the exhaust-gas catalytic converter is an oxidation catalytic converter.

29. The exhaust-gas purification installation according to claim 28, and further comprising a denox catalytic converter arranged in the exhaust pipe downstream of the oxidation catalytic converter, wherein the reformer gas can be fed to the entry side of the oxidation catalytic converter and to an entry side of the denox catalytic converter.

30. An exhaust-gas purification installation for purifying an exhaust gas from an internal combustion engine, comprising:

an exhaust-gas catalytic converter which is arranged in an exhaust pipe of the internal combustion engine, a catalytic fuel reformer adapted to generate a hydrogen-containing reformer gas which can be fed to the exhaust pipe on an entry side of the exhaust-gas catalytic converter, feeding of a hydrocarbon-containing fuel, which can be used to operate the internal combustion engine, to the fuel reformer being possible in order to generate the reformer gas, an exhaust-gas heater provided so as to heat an exhaust-gas part-stream which is fed to the fuel reformer, and a high-temperature heat exchanger adapted to transfer heat from the reformer gas which emerges from the fuel reformer to the exhaust-gas part-stream which is fed to the fuel reformer.

31. The exhaust-gas purification installation according to claim 30, wherein the exhaust-gas catalytic converter is a denox catalytic converter.

32. The exhaust-gas purification installation according to claim 30, wherein the exhaust-gas catalytic converter is an oxidation catalytic converter.

33. The exhaust-gas purification installation according to claim 32, and further comprising a denox catalytic converter arranged in the exhaust pipe downstream of the oxidation catalytic converter, wherein the reformer gas can be fed to the entry side of the oxidation catalytic converter and to an entry side of the denox catalytic converter.

34. The exhaust-gas purification installation according to claim 30, wherein the exhaust-gas part-stream can be fed to the fuel reformer via at least one of the exhaust-gas heater and the high-temperature heat exchanger as desired.

35. The exhaust-gas purification installation according to claim 34, wherein the exhaust-gas catalytic converter is a denox catalytic converter.

36. The exhaust-gas purification installation according to claim 34, wherein the exhaust-gas catalytic converter is an oxidation catalytic converter.

37. The exhaust-gas purification installation according to claim 36, and further comprising a denox catalytic converter arranged in the exhaust pipe downstream of the oxidation catalytic converter, wherein the reformer gas can be fed to the entry side of the oxidation catalytic converter and to an entry side of the denox catalytic converter.

38. An exhaust-gas purification installation for purifying an exhaust gas from an internal combustion engine, comprising:

an exhaust-gas catalytic converter which is arranged in an exhaust pipe of the internal combustion engine, a catalytic fuel reformer adapted to generate a hydrogen-containing reformer gas which can be fed to the exhaust pipe on an entry side of the exhaust-gas catalytic converter, feeding of a hydrocarbon-containing fuel, which can be used to operate the internal combustion engine, to the fuel reformer being possible in order to generate the reformer gas, an electrically heatable exhaust-gas heater provided so as to heat an exhaust-gas part-stream which is fed to the fuel reformer, and a high-temperature heat exchanger adapted to transfer heat from the reformer gas which emerges from the fuel reformer to the exhaust-gas part-stream which is fed to the fuel reformer.

39. The exhaust-gas purification installation according to claim 38, wherein the exhaust-gas part-stream can be fed to the fuel reformer via at least one of the exhaust-gas heater and the high-temperature heat exchanger as desired.

40. An exhaust-gas purification installation for purifying an exhaust gas from an internal combustion engine, comprising:

an exhaust-gas catalytic converter which is arranged in an exhaust pipe of the internal combustion engine, a catalytic fuel reformer adapted to generate a hydrogen-containing reformer gas which can be fed to the exhaust pipe on an entry side of the exhaust-gas catalytic converter, feeding of a hydrocarbon-containing fuel, which can be used to operate the internal combustion engine, to the fuel reformer being possible in order to generate the reformer gas, an exhaust-gas heater provided so as to heat an exhaust-gas part-stream which is fed to the fuel reformer, the exhaust-gas heater being of cylindrical configuration and, in its interior, having a coiled passage, which runs substantially in the axial direction, for guiding the exhaust-gas part-stream, and a high-temperature heat exchanger adapted to transfer heat from the reformer gas which emerges from the fuel reformer to the exhaust-gas part-stream which is fed to the fuel reformer.

41. The exhaust-gas purification installation according to claim 40, wherein the exhaust-gas part-stream can be fed to the fuel reformer via at least one of the exhaust-gas heater and the high-temperature heat exchanger as desired.

* * * * *